United States Patent
Lewandowski et al.

(10) Patent No.: US 11,845,431 B2
(45) Date of Patent: Dec. 19, 2023

(54) ENHANCED VEHICLE OPERATION

(71) Applicant: Ford Global Technologies, LLC, Dearborn, MI (US)

(72) Inventors: Andrew Denis Lewandowski, Sterling Heights, MI (US); Keith Weston, Canton, MI (US); Brendan F. Diamond, Grosse Pointe, MI (US); Jordan Barrett, Milford, MI (US); Michael Alan Mcnees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 17/230,252

(22) Filed: Apr. 14, 2021

(65) Prior Publication Data

US 2022/0332317 A1    Oct. 20, 2022

(51) Int. Cl.
| | |
|---|---|
| *B60W 30/14* | (2006.01) |
| *B60W 30/18* | (2012.01) |
| *B62D 15/02* | (2006.01) |
| *G06V 20/58* | (2022.01) |
| *G06F 18/24* | (2023.01) |

(52) U.S. Cl.
CPC .... *B60W 30/146* (2013.01); *B60W 30/18109* (2013.01); *B62D 15/021* (2013.01); *G06F 18/24* (2023.01); *G06V 20/58* (2022.01); *B60W 2420/403* (2013.01); *B60W 2554/4049* (2020.02)

(58) Field of Classification Search
CPC ......... B60W 30/146; B60W 30/18109; B60W 2420/403; B60W 2554/4049; B62D 15/021; B62D 15/025; G06F 18/24; G06V 20/58
See application file for complete search history.

(56) References Cited

U.S. PATENT DOCUMENTS

| | | | |
|---|---|---|---|
| 7,272,474 B1 * | 9/2007 | Stentz | G01C 7/04 701/28 |
| 2007/0291130 A1 * | 12/2007 | Broggi | H04N 13/243 348/E13.015 |
| 2009/0079839 A1 * | 3/2009 | Fischer | H04N 23/90 348/E5.058 |
| 2017/0292850 A1 | 10/2017 | Madapati | |
| 2020/0231016 A1 * | 7/2020 | Vente | B60G 17/0165 |
| 2022/0281456 A1 * | 9/2022 | Giovanardi | G01S 7/4021 |

FOREIGN PATENT DOCUMENTS

| | | |
|---|---|---|
| DE | 102019007237 A1 | 8/2020 |
| DE | 102012021420 B4 | 9/2020 |
| FR | 286583 B1 | 1/2006 |
| FR | 3096158 A1 | 11/2020 |

* cited by examiner

*Primary Examiner* — Ig T An
(74) *Attorney, Agent, or Firm* — Frank A. MacKenzie; Bejin Bieneman PLC (57) ABSTRACT

Terrain characteristics of an off-road area are determined based on a map. The terrain characteristics include a terrain type, a terrain grade, and a presence or an absence of an obstacle. Vehicle characteristics are determined including a ground clearance and a breakover angle. Based on a user level, vehicle parameters for the off-road area are determined based on the terrain characteristics, the vehicle characteristics, and the user input. The vehicle parameters include a speed and a transmission gear. The vehicle parameters for the off-road area are output.

19 Claims, 2 Drawing Sheets

ENHANCED VEHICLE OPERATION

BACKGROUND

A vehicle can be equipped with electronic and electro-mechanical components, e.g., computing devices, networks, sensors, controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can be supported by acquiring accurate and timely data regarding objects in a vehicle's environment while the vehicle is being operated.

DETAILED DESCRIPTION

Some vehicles may operate both on road areas, e.g., paved, public roads, as well as on various off-road areas. Different vehicle parameters may be required to operate a vehicle on a road area in contrast to on an off-road area. Generally, a vehicle parameter is a limit of a measurement of a physical characteristic of a vehicle or an environment around that vehicle. More specifically, a vehicle parameter herein is a physical limit of vehicle operation, i.e., a vehicle parameter is a value that specifies a physical quantity providing a limit of a measurement of vehicle operation and/or a measurement of an environmental condition limiting vehicle operation.

Typically, a road area includes predefined rules for vehicle operation, e.g., government regulations specifying a speed limit, a designated operation area, such as a lane, a maximum weight for a vehicle on the road area, etc., that specify vehicle parameters for the road areas. However, an off-road area may lack predefined rules for vehicle operation such that vehicle parameters for the off-road area may be unknown. In this situation, the vehicle may be operated in the off-road area based on undesirable vehicle parameters, which can result in the vehicle becoming stuck or damaged in the off-road area.

Advantageously, a vehicle computer can determine terrain characteristics (as discussed below) based on a map of the off-road area. The vehicle computer can then determine vehicle parameters for the off-road area based on the terrain characteristics, vehicle characteristics, and a user level (as discussed below). Determining vehicle parameters for the off-road area allows the vehicle computer to determine a planned path to traverse the off-road area based on the vehicle parameters, which can reduce the likelihood of the vehicle becoming stuck or damaged while operating in the off-road area.

A vehicle includes a sensor and a computer communicatively coupled to the sensor. The computer includes processor and a memory, the memory storing instructions executable by the processor to determine terrain characteristics of an off-road area based on data obtained from the sensor. The terrain characteristics include a terrain type, a terrain grade, and a presence or an absence of an obstacle. The instructions further include instructions to determine vehicle characteristics including a ground clearance and a breakover angle. The instructions further include instructions to, based on a user level, determine vehicle parameters for the off-road area based on the terrain characteristics, the vehicle characteristics, and the user input. The vehicle parameters include a speed and a transmission gear. The instructions further include instructions to determine a planned path for the off-road area based on the vehicle parameters.

The instructions can further include instructions to operate the vehicle based on the planned path.

The instructions can further include instructions to provide the planned path to a remote computer.

The instructions can further include instructions to, upon predicting a path for the vehicle based on a steering wheel angle, determine to update the steering wheel angle based on comparing the predicted path to the planned path.

The instructions can further include instructions to generate a map of the off-road area based on data obtained from the sensor.

The instructions can further include instructions to provide the map to a remote computer.

The instructions can further include instructions to, upon detecting the presence of the obstacle, classify the obstacle as one of traversable or non-traversable based on the vehicle characteristics and obstacle characteristics.

The instructions can further include instructions to determine obstacle characteristics based on data obtained from the sensor.

A system includes a computer including a processor and a memory, the memory storing instructions executable by the processor to determine terrain characteristics of an off-road area based on data obtained from the sensor. The terrain characteristics include a terrain type, a terrain grade, and a presence or an absence of an obstacle. The instructions further include instructions to determine vehicle characteristics including a ground clearance and a breakover angle. The instructions further include instructions to, based on a user level, determine vehicle parameters for the off-road area based on the terrain characteristics, the vehicle characteristics, and the user input. The vehicle parameters include a speed and a transmission gear. The instructions further include instructions to output the vehicle parameters for the off-road area.

The instructions can further include instructions to, upon determining a planned path for the off-road area based on the vehicle parameters, operate the vehicle based on the planned path.

The instructions can further include instructions to, upon determining a planned path for the off-road area based on the vehicle parameters, output the planned path for the off-road area.

The instructions can further include instructions to provide the planned path to a remote computer.

The instructions can further include instructions to, upon determining a predicted path of the vehicle based on sensor data, output the predicted path overlaid on the planned path.

The instructions can further include instructions to, upon predicting a path for the vehicle based on a steering wheel angle, determine to update the steering wheel angle based on comparing the predicted path to the planned path.

The instructions can further include instructions to determine the vehicle characteristics based on sensor data.

The instructions can further include instructions to determine the vehicle characteristics based on a user input specifying the vehicle characteristics.

The instructions can further include instructions to generate the map based on sensor data.

The instructions can further include instructions to obtain the map from a remote computer.

The instructions can further include instructions to, upon detecting the presence of the obstacle, classify the obstacle as one of traversable or non-traversable based on the vehicle characteristics and obstacle characteristics.

The instructions can further include instructions to determine obstacle characteristics based on at least one of sensor data or the map.

Further disclosed herein is a computing device programmed to execute any of the above method steps. Yet further disclosed herein is a computer program product, including a computer readable medium storing instructions executable by a computer processor, to execute an of the above method steps.

Figure 1:
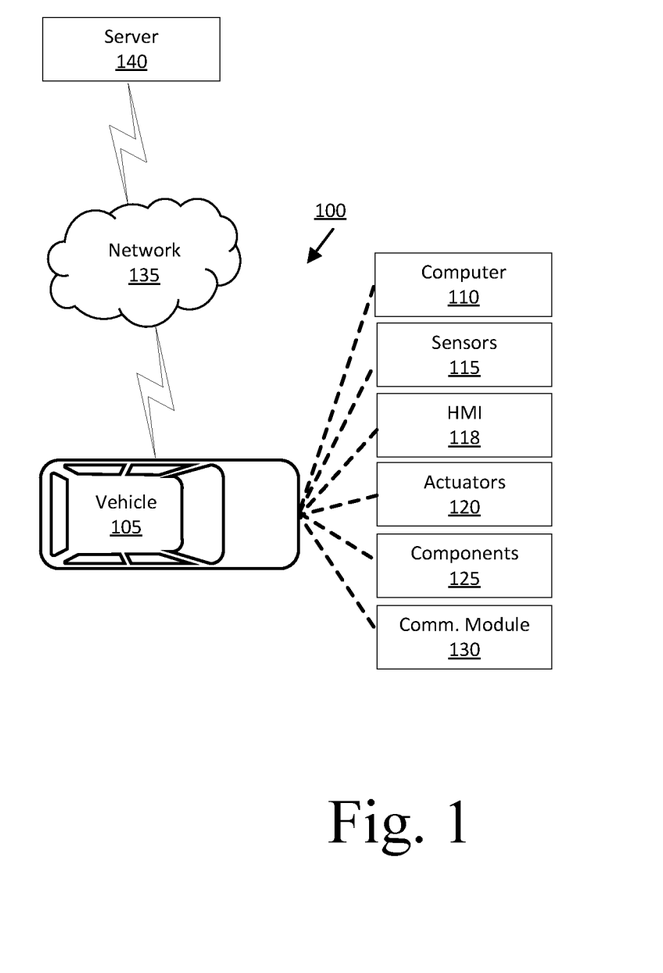
FIG. 1 is a block diagram of an example vehicle control system.

FIG. 1 is a block diagram illustrating an example control system 100. A vehicle 105 includes a vehicle computer 110 that receives data from sensors 115. The vehicle computer 110 is programmed to determine terrain characteristics of an off-road area based on a map. The terrain characteristics include a terrain type, a terrain grade, and a presence or an absence of an obstacle. The vehicle computer 110 is further programmed to determine vehicle 105 characteristics including a ground clearance and a breakover angle. The vehicle computer 110 is further programmed to, based on a user level, determine vehicle 105 parameters for the off-road area based on the terrain characteristics, the vehicle 105 characteristics, and the user input, wherein the vehicle 105 parameters include a speed and a transmission gear. The vehicle computer 110 is further programmed to output the vehicle 105 parameters for the off-road area.

The vehicle 105 includes the vehicle computer 110, sensors 115, actuators 120 to actuate various vehicle components 125, and a vehicle communications module 130. The communications module 130 allows the vehicle computer 110 to communicate with a remote server computer 140 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings 305, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present document, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., CV2X, DSRC, cellular, or the like.

The network 135 represents one or more mechanisms by which a vehicle computer 110 may communicate with remote computing devices, e.g., the remote server computer 140 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The vehicle computer 110 is programmed to determine whether the vehicle 105 is in a road area or an off-road area. A road area is an area of ground surface that includes any paved or finished surface provided for land vehicle travel. An off-road area is an area of ground surface that includes any surface not altered to provide for vehicle travel.

The vehicle computer 110 may, for example, determine whether the vehicle 105 is in the road area or the off-road area based on data, e.g., map data, received from, e.g., a remote server computer 140. For example, the vehicle computer 110 may receive a location of the vehicle 105, e.g., from a sensor 115, a navigation system, the remote server computer 140, etc. The vehicle computer 110 can compare the location of the vehicle 105 to the map data, e.g., to determine whether the vehicle 105 is in the road area or the off-road area specified in the map data. As another example, the vehicle computer 110 can determine the vehicle 105 is in the road area based on GPS-based geo-fencing. A geo-fence herein has the conventional meaning of a boundary for an area defined by sets of geo-coordinates. In such an example, the GPS geo-fence specifies a perimeter of a road area. The vehicle computer 110 can determine the vehicle 105 is in the road area based on the location data of the vehicle 105 indicating the vehicle 105 is within a geo-fence that specifies the road area. Conversely, the vehicle computer 110 can determine the vehicle 105 is in an off-road area based on the location data of the vehicle 105 indicating the vehicle 105 is not within a geo-fence that specifies a road area.

Alternatively, the vehicle computer 110 can receive and analyze image data from one or more sensors 115 to determine a road area or an off-road area. In such an example, the image data includes the environment around the vehicle 105. The vehicle computer 110 can determine the vehicle 105 is in the road area or the off-road area based on identifying objects and/or markings in the image data, e.g., using image recognition techniques. For example, the vehicle computer 110 can determine the vehicle 105 is in a road area based on identifying lane markers, i.e., painted lines in the road area defining one or more lanes in the road area, in the image data. As another example, the vehicle computer 110 can determine the vehicle 105 is in an off-road area based on identifying a terrain of vehicle 105 operation.

The vehicle computer 110 is programmed to transition an off-road operation mode between a disabled state and an enabled state based on the location of the vehicle 105. For example, upon determining that the vehicle 105 has moved from a road area to an off-road area, the vehicle computer 110 enables the off-road operation mode from the disabled state to the enabled state. As another example, upon determining that the vehicle 105 has moved from an off-road area to a road area, the vehicle computer 110 disables the off-road operation mode from the enabled state to the disabled state. That is, the off-road operation mode is enabled when the vehicle 105 is in an off-road area and is disabled when the vehicle 105 is in the road area.

The off-road operation mode determines vehicle 105 parameters for operating the vehicle 105 in an off-road area. That is, the off-road operation mode determines vehicle 105 parameters that reduce a likelihood of the vehicle 105 getting stuck and/or damaged while traversing the off-road area. A variety of vehicle 105 parameters may be determined for vehicle 105 operation in the off-road area. A non-limiting list of vehicle 105 parameters includes a speed of the vehicle 105, a transmission gear, an acceleration rate of the vehicle 105, a minimum ground clearance for the vehicle 105, etc.

When the off-road operation mode is in the enabled state, the vehicle computer 110 enables user selection of the off-road operation mode. For example, the vehicle computer 110 may actuate the HMI 118 to detect a first user input selecting the off-road operation mode. For example, the HMI 118 may be programmed to display a virtual button on a touchscreen display that the user can select to select the off-road operation mode. In this situation, the HMI 118 may activate sensors 115 that can detect the user selecting the virtual button to select the cruise control mode. As another example, the HMI 118 may be programmed to provide a virtual button or the like that is non-selectable when the cruise control mode is in the disabled state, and selectable via the touchscreen display when the cruise control mode is in the enabled state. Upon detecting the first user input, the HMI 118 can then provide the first user input to the vehicle computer 110, and the vehicle computer 110 can select the off-road operation mode based on the first user input.

When the off-road operation mode is in the disabled state, the vehicle computer 110 prevents user selection of the off-road operation mode. Said differently, the vehicle computer 110 prevents the user from selecting the off-road operation mode when the vehicle 105 is on a road area. For example, the vehicle computer 110 may actuate the HMI 118 to disable detection of the first user input. In this manner, the vehicle computer 110 can prevent the user from selecting the off-road operation mode. For example, the HMI 118 may be programmed to remove a virtual button from the touchscreen display. As another example, the HMI 118 may be programmed to make the virtual button non-selectable.

In the off-road operation mode, the vehicle computer 110 can determine a user level based on receiving a second user input specifying the user level. For example, the vehicle computer 110 can actuate the HMI 118 to detect the second user input, e.g., in substantially the same manner as discussed above regarding detecting the first user input. As used herein, a "user level" is a measure that the vehicle computer 110 can use to determine the vehicle 105 parameters for the off-road area, and that indicates a reduction in the likelihood that the vehicle will get stuck and/or damaged while traversing the off-road area. The user level may be specified as a text string, e.g., "high", "medium", or "low". As another example, the user level may be specified as a number, e.g., an integer on a scale from 1 to 3, inclusive. In this example, a user level of 3 represents a higher reduction in the likelihood that the vehicle will get stuck and/or damaged while traversing the off-road area than a user level of 2 or 1, and a user level of 1 represents a lower reduction in the likelihood that the vehicle will get stuck and/or damaged while traversing the off-road area than a user level of 2.

Additionally, in the off-road operation mode, the vehicle computer 110 can determine one or more vehicle 105 characteristics. A vehicle characteristic herein means a measurement of a physical phenomenon, i.e., a physical quantity, for the vehicle 105, i.e., a value that can be compared to a vehicle parameter. Non-limiting examples of vehicle 105 characteristics include dimensions (e.g., length, width, height), ground clearance, a suspension spring rate, wheelbase, approach angle (i.e., an angle defined by a ground surface and a line extending from a ground surface and tangent to a front wheel and a leading edge of the vehicle 105), breakover angle (i.e., an angle defined by a first line extending from the ground surface to a lowest point on a vehicle 105 body and tangent to the front wheel and a second line extending from the ground surface to the first line and tangent to the rear wheel), departure angle (i.e., an angle defined by the ground surface and a line extending from the ground surface and tangent to a rear wheel and a trailing edge of the vehicle 105), tire pressure, wheel diameter, a cargo load, etc.

One or more vehicle 105 characteristics can be stored, e.g., in a memory of the vehicle computer 110. In this situation, the vehicle computer 110 can determine the one or more vehicle 105 characteristics by accessing the memory. Additionally, or alternatively, the vehicle computer 110 can determine the vehicle 105 characteristics based on receiving, e.g., via the HMI 118, a user input specifying the vehicle 105 characteristics. For example, the vehicle computer 110 can actuate the HMI 118 to detect the user input specifying the vehicle 105 characteristics, e.g., in substantially the same manner as discussed above regarding detecting the first user input. Additionally, or alternatively, the vehicle computer 110 can determine one or more vehicle 105 characteristics based on sensor 115 data, such as tire pressure sensor 115 data, weight sensor 115 data, etc.

Additionally, upon determining that the vehicle 105 has moved into an off-road area, the vehicle computer 110 can access a map of the off-road area from a memory of the vehicle computer 110. The map can, for example, specify terrain characteristics of the off-road area. Terrain characteristics are physical quantities that describe measurements and/or limitations of the road. Non-limiting examples of terrain characteristics include a type of terrain (e.g., mud, rocks, gravel, dirt, grass, etc.), a curvature, a terrain grade (or inclination), a presence or absence of obstacles, etc.

The vehicle computer 110 can, for example, receive the map of the off-road area, e.g., from the remote server computer 140, another vehicle, an aerial drone, etc., and store the map in the memory of the vehicle computer 110. In such an example, the remote server computer 140 can generate and update the map based on aggregated data (as discussed below). As another example, the vehicle computer 110 can generate the map of the off-road area based on sensor 115 data. Additionally, or alternatively, in such an example, the vehicle computer 110 can provide the map to the remote server computer 140, e.g., via the network 135.

In an example in which the vehicle computer 110 generates the map, the vehicle computer 110 is programmed to actuate one or more sensors 115 to record an environment around the vehicle 105. That is, the vehicle computer 110 can receive sensor 115 data, e.g., image data, of the environment around the vehicle 105. The image data can include one or more objects around the vehicle 105. For example, the vehicle computer 110 can be programmed to classify and/or identify object(s) based on sensor 115 data. For example, object classification techniques can be used, e.g., in the vehicle computer 110 based on lidar sensor 115 data, camera sensor 115 data, etc., to classify a detected object as mobile or stationary, i.e., non-movable. Additionally, or alternatively, object identification techniques can be used, e.g., in the vehicle computer 110 based on lidar sensor 115 data, camera sensor 115 data, etc., to identify a type of object, e.g., a vehicle 105, a pedestrian, an obstacle (as discussed below), etc., as well as physical features of objects. Non-limiting examples of objects include a pedestrian, another vehicle, a rock, a tree, etc.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle 105 sensor 115 data, e.g., an image, and then provide as output, for each of one or more respective regions of interest in the image, an identification and/or a classification (i.e., mobile or stationary) of one or more objects or an indication that no object is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 can then generate the map based on the sensor 115 data of the environment around the vehicle 105. For example, the vehicle computer 110 can identify terrain characteristics based on sensor 115 data. For example, the classifier can be further trained with data known to represent various terrain characteristics. Thus, in addition to identifying objects, the classifier can output an identification of terrain characteristics. Once trained, the classifier can accept as input vehicle 105 sensor 115 data, e.g., an image including the environment around the vehicle 105, and then provide as output an identification of terrain characteristics.

As used herein, an "obstacle" is a type of object, e.g., a rock, a log, a puddle, etc., that a vehicle 105 is permitted to traverse, i.e., travel over or through. Various obstacles may be specified by a vehicle 105 and/or component 125 manufacturer, and stored in the memory of the vehicle computer 110. Upon determining a presence of an obstacle, e.g., as output from the classifier, the vehicle computer 110 can be programmed to determine obstacle characteristics, i.e., a measurable physical quantity, i.e., a measurement of a physical phenomenon, for an obstacle, e.g., dimensions (height, length, width), a location, an orientation, etc. For example, the vehicle computer 110 can determine the obstacle characteristics based on image data including the obstacle, e.g., by using image recognition techniques.

Upon determining the obstacle characteristics, the vehicle computer 110 can classify the obstacle as one or traversable or non-traversable based on the vehicle 105 characteristics and the obstacle characteristics. That is, the vehicle computer 110 can determine whether the vehicle 105 is able to traverse the obstacle, e.g., without a body of the vehicle 105 impacting the obstacle. For example, the classifier can be further trained with data known to represent various obstacle characteristics. Thus, in addition to identifying objects and terrain characteristics, the classifier can output a classification of an obstacle. Once trained, the classifier can accept as input the obstacle characteristics and then provide as output the classification of the obstacle as traversable or non-traversable. As another example, the vehicle computer 110 can use geometric functions based on the vehicle 105 characteristics and the obstacle characteristics to determine whether the vehicle 105 can traverse the obstacle, e.g., without a body of the vehicle 105 impacting the obstacle.

Upon determining the classification of the obstacle, the vehicle computer 110 can output the classification. For example, the vehicle computer 110 can actuate the HMI 118 to display a representation of the traversable obstacles and the non-traversable obstacles, e.g., by representing the different classifications in separate colors, such as green and red, respectively. Additionally, or alternatively, the vehicle computer 110 can provide the classifications to the remote server computer 140.

The vehicle computer 11 determines the vehicle 105 parameters for the off-road area based on the vehicle 105 characteristics and the terrain characteristics. Upon determining the vehicle 105 parameters, the vehicle computer 110 can then output the vehicle 105 parameters. For example, the vehicle computer 110 can actuate the HMI 118 to display a representation of the vehicle 105 parameters to a user. As another example, the vehicle computer 110 can provide the vehicle 105 parameters to a remote server computer 140, a user device (e.g., a smartphone, a tablet, a personal digital assistant, a smart watch, a laptop, etc.), etc., e.g., via the network 135.

To determine the vehicle 105 parameters, the vehicle computer 110 may, for example, maintain a look-up table, or the like, that associates various vehicle 105 characteristics and the terrain characteristics with corresponding vehicle 105 parameters. The vehicle computer 110 can, for example, access the look-up table and determine the vehicle 105 parameters for the off-road area based on stored vehicle 105 characteristics and stored terrain characteristics matching the determined vehicle 105 characteristics and the determined terrain characteristics. The look-up table may be stored, e.g., in a memory of the vehicle computer 110.

Additionally, the vehicle computer 110 determines the vehicle 105 parameters based on the user level. That is, the vehicle computer 110 can determine different vehicle 105 parameters for different user levels given identical vehicle 105 and terrain characteristics. For example, the look-up table may associate various vehicle 105 parameters for given terrain and vehicle 105 characteristics corresponding to user levels. In such an example, the vehicle computer 110 can determine the vehicle 105 parameters based on the look-up table, as discussed above. An example look-up table is shown in Table 1 below. It is to be understood that Table 1 is offered merely for exemplary purposes, and that additional or fewer vehicle characteristics and terrain characteristics may be used to determine additional or fewer vehicle parameters.

TABLE 1

| Vehicle Characteristic | Terrain Characteristic | User Level | Vehicle Parameter |
|---|---|---|---|
| Spring rate: 150 lbs./in.; Cargo Load: 200 lbs.; Breakover Angle: 28 degrees; | rocks; Grade: 30 degrees; Obstacles: heights between 5-20 inches | 3 | Minimum Ground Clearance: 5 in.; Max Speed: 5 miles per hour; |
| Ground Clearance: 11.5 in Spring rate: 150 lbs./in.; Cargo Load: 200 lbs.; Breakover Angle: 28 degrees; | rocks; Grade: 30 degrees; Obstacles: heights between 5-20 inches | 1 | Transmission Gear: 2 Minimum Ground Clearance: 1 in.; Max Speed: 10 miles per hour; |
| Ground Clearance: 11.5 in Spring rate: 100 lbs./in.; Cargo Load: 0 lbs.; Breakover Angle: 24 degrees; Ground Clearance: 7.8 in | mud; Grade: degrees; No obstacles | 3 | Transmission Gear: 2 Max Speed: 20 miles per hour |
| Spring rate: 100 lbs./in.; Cargo Load: 0 lbs.; Breakover Angle: 24 degrees; Ground Clearance: 7.8 in | mud; Grade: 5 degrees; No obstacles | 1 | Max Speed: 40 miles per hour; |

As another example, the look-up table may lack the user level. In such an example, the vehicle computer 110 can determine that the vehicle 105 parameters are a predetermined percentage of the vehicle 105 parameters specified in the look-up table. As one example, when the user level is a highest user level, e.g., "high" (or 3), the vehicle computer 110 can determine that a speed for the vehicle 105 is, e.g., 75%, of a speed specified in the look-up table and a ground clearance for the vehicle 105 is, e.g., 125%, of a ground clearance specified in the look-up table. As another example, when the user level is a lowest user level, e.g., "low" (or 1), the vehicle computer 110 can determine that a speed for the vehicle 105 is, e.g., 125%, of a speed specified in the look-up table and a ground clearance for the vehicle 105 is, e.g., 75%, of a ground clearance specified in the look-up table.

The vehicle 105 parameters stored in the look-up table can, for example, be determined based on empirical testing of various vehicles operating in various test environments, e.g., representing various off-road areas. As another example, the vehicle 105 parameters stored in the look-up table can be determined based on simulation data. For example, the remote server computer 140 can input vehicle 105 characteristics into a vehicle dynamics model. The "vehicle dynamics model" is a kinematic model describing vehicle 105 motion that outputs performance data for the vehicle 105 according to terrain characteristics. The vehicle dynamics model includes a model of a plurality of terrains. Each terrain includes specified terrain characteristics. By inputting a virtual vehicle to the vehicle dynamics model, the remote server computer 140 can collect data about performance of the virtual vehicle on various terrains. That is, the remote server computer 140 can test the virtual vehicle in a plurality of different (simulated and/or actual) environments. In this situation, the remote server computer 140 can determine the vehicle 105 parameters for various terrain characteristics from the collected data. The remote server computer 140 can then generate the look-up table, and provide the look-up table to a plurality of vehicles, including the vehicle 105, e.g., via the network 135.

The vehicle computer 110 can generate a planned path to operate the vehicle 105 in the off-road area based on the vehicle 105 parameters. The vehicle computer 110 determines the planned path such that the vehicle 105 can be operated along the planned path while meeting the vehicle 105 parameters. That is, the vehicle 105 can be operated without violating the limits specified by the vehicle 105 parameters. For example, the planned path may direct the vehicle 105 to operate over traversable obstacles and to avoid non-traversable obstacles. Upon determining the planned path, the vehicle computer 110 can output the planned path. For example, the vehicle computer 110 can actuate the HMI 118 to display a representation of the planned path. As another example, the vehicle computer 110 can provide the planned path to a remote server computer 140, a user device, etc., e.g., via the network 135.

As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x) = a_0 + a_1 x + a_2 x^2 + a_3 x^3 \tag{1}$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

Upon determining the planned path, the vehicle computer 110 can output a predicted path for the vehicle 105 and a steering wheel angle to direct the vehicle 105 along the planned path. For example, the vehicle computer 110 can actuate the HMI 118 to display a representation of the steering wheel angle. Additionally, the vehicle computer 110 can actuate the HMI 118 to display a representation of the predicted path. In this situation, the HMI 118 can be programmed to overlay the predicted path onto the planned path. Additionally, or alternatively, the vehicle computer 110 can provide the predicted path and/or the steering wheel angle to a remote server computer 140, a user device, etc., e.g., via the network 135.

The vehicle computer 110 can predict a path of the vehicle 105 based on a current steering wheel angle. A "steering wheel angle" is an angle of rotation of a steering wheel relative to a neutral position of the steering wheel. The vehicle computer 110 can determine the current steering wheel angle based on data received from a steering wheel sensor 115. The vehicle computer 110 can then determine a current steering angle based on the current steering wheel angle and a steering ratio (i.e., a ratio of an angle change of the steering wheel to an angle change of front wheels). The steering ratio may be stored, e.g., in the memory of the vehicle computer 110. A "steering angle" is an angle defined between an axis extending longitudinally through a center of one front wheel of a vehicle 105 and a longitudinal axis of the vehicle 105. That is, the steering angle indicates a direction of travel of the vehicle 105 relative to the longitudinal axis of the vehicle 105. The vehicle computer 110 can predict the path of the vehicle 105 from the current steering angle and the vehicle 105 characteristics, e.g., using path planning algorithms.

Upon predicting the path of the vehicle 105, the vehicle computer 110 can compare the predicted path to the planned path. If the predicted path substantially matches the planned path, then the vehicle computer 110 can determine to maintain the current steering wheel angle. In this situation, the vehicle computer 110 outputs the current steering wheel angle to direct the vehicle 105 along the planned path. If the predicted path differs from, i.e., does not substantially match, the planned path, then the vehicle computer 110 can determine to update the current steering wheel angle. The vehicle computer 110 can determine a magnitude and direction of the updated steering wheel angle by comparing the steering angle to a planned steering angle that corresponds to vehicle 105 operation along the planned path. The vehicle computer 110 can subtract the current steering angle from the planned steering angle to get a value, and then, using the steering ratio, determine the magnitude of the updated steering wheel angle based on the value. If the value is positive, then the direction of the updated steering wheel angle is a first direction, e.g., counterclockwise. If the value is negative, then the direction of the updated steering wheel angle is a second direction, e.g., clockwise. In this situation, the vehicle computer 110 outputs the updated steering wheel angle to direct the vehicle 105 along the planned path.

Alternatively, upon determining the planned path for the off-road area, the vehicle computer 110 can be programmed to operate the vehicle 105 along the planned path. For example, the vehicle computer 110 can actuate one or more vehicle components 125 to move the vehicle 105 along the planned path while satisfying the vehicle 105 parameters for the off-road area. For example, the vehicle computer 110 can actuate a propulsion component to move the vehicle 105 at a speed specified by the look-up table and can actuate a transmission component to engage a transmission gear specified by the look-up table.

The remote server computer 140 may be programmed to update the map of the off-road, e.g., stored in a memory of the remote server computer 140, based on aggregated data. Aggregated data in this context means data from a plurality of vehicle computers 110 that provide messages that is combined arithmetically and/or mathematically, e.g., by averaging and/or using some other statistical measure. That is, the remote server computer 140 may be programmed to receive messages from a plurality of vehicle computers 110 indicating terrain characteristics for an off-road area based on vehicle data of a plurality of vehicles. Based on the aggregated data indicating the terrain characteristics (e.g., an average number of messages, a percentage of messages, etc., indicating the terrain characteristics), and taking advantage of the fact that messages from different vehicles are provided independently of one another, the remote server computer 140 can update the map to specify the terrain characteristics based on the vehicle data. The remote server computer 140 can then transmit the map to a plurality of vehicles, including the vehicle 105, e.g., via the network 135.

Figure 2:
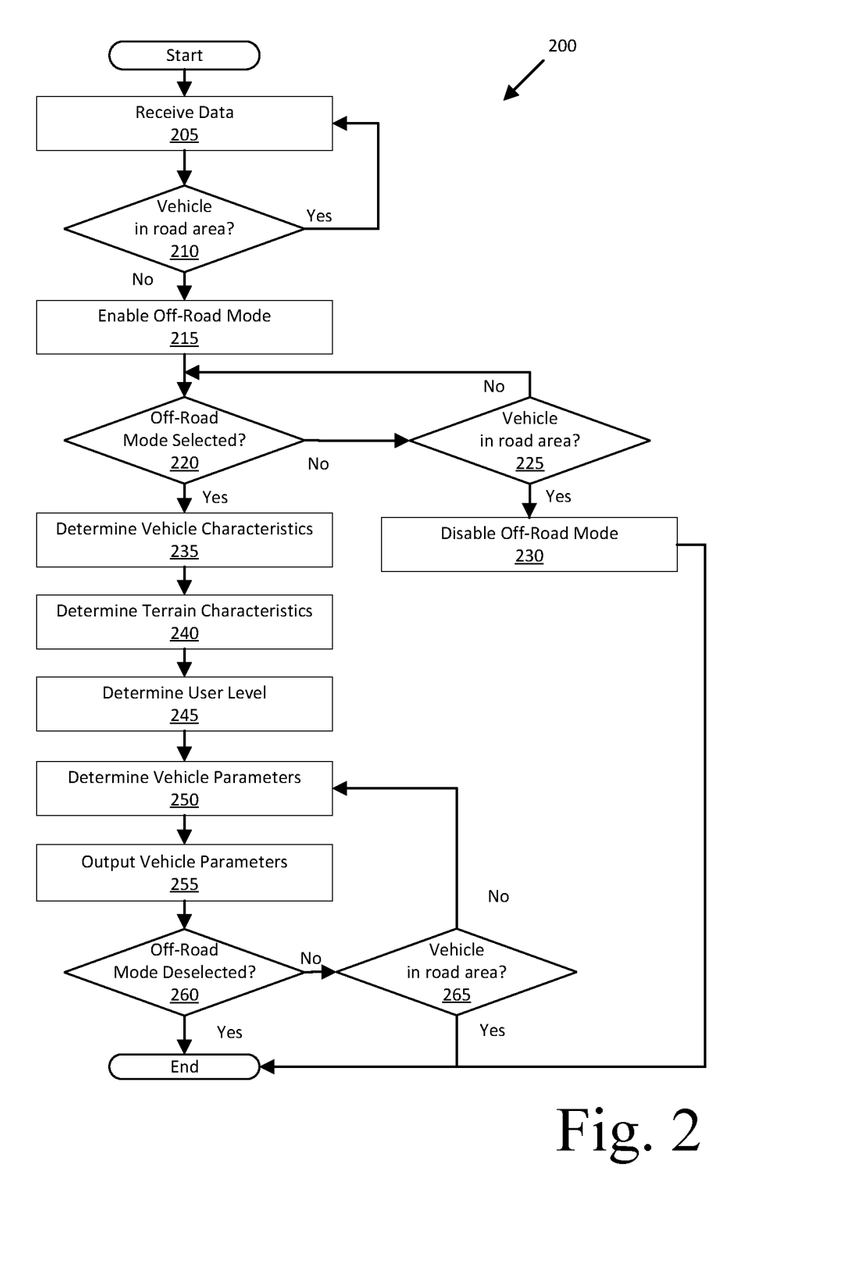
FIG. 2 is a flowchart of an example process for determining vehicle parameters for an off-road area.

FIG. 2 is a diagram of an example process 200 for determining vehicle parameters for an off-road area. The process 200 begins in a block 205. The process 200 can be carried out by a vehicle computer 110 included in a vehicle 105 executing program instructions stored in a memory thereof.

In the block 205, the vehicle computer 110 receives data from one or more sensors 115, e.g., via a vehicle 105 network 135, from a remote server computer 140, e.g., via a network 135, and/or from a computer in another vehicle, e.g., via V2V communications. For example, the vehicle computer 110 can receive location data, e.g., geo-coordinates, of the vehicle 105, e.g., from a sensor 115, a navigation system, etc. Additionally, the vehicle computer 110 can receive image data, e.g., from one or more image sensors 115. The image data may include data about the environment around the vehicle 105, e.g., lane markings on a road area, terrain characteristics for an off-road area, etc. The process 200 continues in a block 210.

In the block 210, the vehicle computer 110 determines whether the vehicle 105 is operating in a road area or an off-road area based on the received data, e.g., image data and/or location data, as discussed above. If the vehicle computer 110 determines that the vehicle 105 is not in a road area, i.e., is in an off-road area, then the process 200 continues in a block 215. Otherwise, the process 200 returns to the block 205.

In the block 215, the vehicle computer 110 transitions an off-road operation mode to an enabled state. In the enabled state, the vehicle computer 110 enables user selection of the off-road operation mode, as discussed above. The process 200 continues in a block 220.

In the block 220, the vehicle computer 110 determines whether the off-road operation mode is selected. As discussed above, an HMI 118 can detect a first user input selecting the off-road operation mode and can provide the detected first input to the vehicle computer. If the vehicle computer receives the first user input selecting the off-road operation mode, then the process 200 continues in a block 235. Otherwise, the process 200 continues in a block 225.

In the block 225, the vehicle computer 110 determines whether the vehicle 105 is in a road area. The block 225 is substantially the same as the block 210 of process 200 and therefore will not be described further to avoid redundancy. If the vehicle computer 110 determines that the vehicle 105 is not in a road area, i.e., is in an off-road area, then the process 200 returns to the block 220. Otherwise, the process 200 continues in a block 230.

In the block 230, the vehicle computer 110 transitions the off-road operation mode to a disabled state. In the disabled state, the vehicle computer 110 prevents user selection of the off-road operation mode, as discussed above. The process 200 ends following the block 230.

In the block 235, the vehicle computer 110 determines vehicle characteristics, e.g., by accessing a memory, obtaining sensor 115 data, and/or receiving a user input specifying the vehicle characteristics, as discussed above. The process 200 continues in a block 240.

In the block 240, the vehicle computer 110 determines terrain characteristics for the off-road area. The vehicle computer 110 can determine the terrain characteristics based on a map that specifies the terrain characteristics for the off-road area, as discussed above. The vehicle computer 110 can generate the map based on sensor 115 data, or the vehicle computer 110 can receive the map from, e.g., a remote server computer 140, another vehicle, a drone, etc., as discussed above. The process 200 continues in a block 245.

In the block 245, the vehicle computer 110 determines a user level. The vehicle computer 110 can receive a user input, e.g., via the HMI 118, specifying the user level, as discussed above. The process 200 continues in a block 250.

In the block 250, the vehicle computer 110 determines vehicle parameters for the off-road area based on the vehicle characteristics, the terrain characteristics, and the user level. As discussed above, the vehicle computer 110 can access a look-up table that associates various vehicle characteristics, the terrain characteristics, and the user levels with corresponding vehicle parameters. The process 200 continues in a block 255.

In the block 255, the vehicle computer 110 outputs the vehicle 105 parameters. As discussed above, the vehicle computer 110 can actuate the HMI 118 to display the vehicle parameters, and/or the vehicle computer 110 can provide the vehicle 105 parameters to the remote server computer 140, e.g., via the network 135. Additionally, upon determining the vehicle 105 parameters, the vehicle computer 110 can determine a planned path based on the vehicle 105 parameters, as discussed above. The vehicle computer 110 can then determine a steering wheel angle to direct the vehicle 105 along the planned path, and output the determined steering wheel angle, e.g., via the HMI 118, as discussed above. Alternatively, the vehicle computer 110 can operate the vehicle 105 along the planned path, e.g., by actuating one or more vehicle components 125 to move the vehicle 105 while meeting the limits specified by the vehicle 105 parameters.

In the block 260, the vehicle computer 110 determines whether the off-road operation mode has been deselected. For example, the HMI 118 can detect a user input deselecting the off-road operation mode, e.g., in substantially the same manner as discussed above regarding detecting selection of the off-road operation mode. If the vehicle computer 110 does no receive a user input deselecting the off-road operation mode, then the process 200 continues in a block 265. Otherwise, the process 200 ends.

In the block 265, the vehicle computer 110 determines whether the vehicle 105 is in a road area. The block 265 is substantially the same as the block 210 of process 200 and therefore will not be described further to avoid redundancy. If the vehicle computer 110 determines that the vehicle 105 is not in a road area, i.e., is in an off-road area, then the process 200 returns to the block 250. Otherwise, the process 200 continues ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A vehicle, comprising:
a sensor;
a computer communicatively coupled to the sensor;
wherein the computer includes a processor and a memory, the memory storing instructions executable by the processor to:
determine terrain characteristics of an off-road area based on data obtained from the sensor, wherein the terrain characteristics include a terrain type that specifies a surface of the terrain, a terrain grade, and a presence or an absence of an obstacle;
determine vehicle characteristics of the vehicle including a ground clearance and a breakover angle;
determine vehicle parameters for the off-road area based on the terrain characteristics, the vehicle characteristics, and a user level specified according to a user input and that indicates a reduction in a likelihood that the vehicle will get stuck and/or damaged while traversing the off-road area, wherein the vehicle parameters include a speed and a transmission gear;
determine a planned path for the off-road area based on the vehicle parameters; and
actuate a vehicle component based on the planned path.

2. The vehicle of claim 1, wherein the instructions further include instructions to provide the planned path to a remote computer.

3. The vehicle of claim 1, wherein the instructions further include instructions to, upon predicting a path for the vehicle based on a steering wheel angle, determine to update the steering wheel angle based on comparing the predicted path to the planned path.

4. The vehicle of claim 1, wherein the instructions further include instructions to generate a map of the off-road area based on data obtained from the sensor.

5. The vehicle of claim 4, wherein the instructions further include instructions to provide the map to a remote computer.

6. The vehicle of claim 1, wherein the instructions further include instructions to, upon detecting the presence of the obstacle, classify the obstacle as one of traversable or non-traversable based on the vehicle characteristics and obstacle characteristics.

7. The vehicle of claim 6, wherein the instructions further include instructions to determine obstacle characteristics based on data obtained from the sensor.

8. A system, comprising a computer including a processor and a memory, the memory storing instructions executable by the processor to:
determine terrain characteristics of an off-road area based on a map, wherein the terrain characteristics include a terrain type that specifies a surface of the terrain, a terrain grade, and a presence or an absence of an obstacle;
determine characteristics of a vehicle including a ground clearance and a breakover angle;
determine vehicle parameters for the off-road area based on the terrain characteristics, the vehicle characteristics, and a user level specified according to a user input and that indicates a reduction in a likelihood that the vehicle will get stuck and/or damaged while traversing the off-road area, wherein the vehicle parameters include a speed and a transmission gear;
determine a planned path for the off-road area based on the vehicle parameters; and
actuate a vehicle component based on the planned path.

9. The system of claim 8, wherein the instructions further include instructions to, upon determining the planned path for the off-road area based on the vehicle parameters, output the planned path for the off-road area.

10. The system of claim 9, wherein the instructions further include instructions to provide the planned path to a remote computer.

11. The system of claim 9, wherein the instructions further include instructions to, upon determining a predicted path of the vehicle based on sensor data, output the predicted path overlaid on the planned path.

12. The system of claim 9, wherein the instructions further include instructions to, upon predicting a path for the vehicle based on a steering wheel angle, determine to update the steering wheel angle based on comparing the predicted path to the planned path.

13. The system of claim 8, wherein the instructions further include instructions to determine the vehicle characteristics based on sensor data.

14. The system of claim 8, wherein the instructions further include instructions to determine the vehicle characteristics based on a user input specifying the vehicle characteristics.

15. The system of claim 8, wherein the instructions further include instructions to generate the map based on sensor data.

16. The system of claim 8, wherein the instructions further include instructions to obtain the map from a remote computer.

17. The system of claim 8, wherein the instructions further include instructions to, upon detecting the presence of the obstacle, classify the obstacle as one of traversable or non-traversable based on the vehicle characteristics and obstacle characteristics.

18. The system of claim 17, wherein the instructions further include instructions to determine obstacle characteristics based on at least one of sensor data or the map.

19. A method, comprising:
determining terrain characteristics of an off-road area based on a map, wherein the terrain characteristics include a terrain type that specifies a surface of the terrain, a terrain grade, and a presence or an absence of an obstacle;
determining characteristics of a vehicle including a ground clearance and a breakover angle;
determining vehicle parameters for the off-road area based on the terrain characteristics, the vehicle characteristics, and a user level specified according to a user input and that indicates a reduction in a likelihood that the vehicle will get stuck and/or damaged while traversing the off-road area, wherein the vehicle parameters include a speed and a transmission gear;
determining a planned path for the off-road area based on the vehicle parameters; and
actuating a vehicle component based on the planned path.

* * * * *